Dec. 9, 1969  W. BRUHN ETAL  3,482,662
AIR BRAKE CYLINDER WITH SLACK ADJUSTER
Filed June 22, 1967
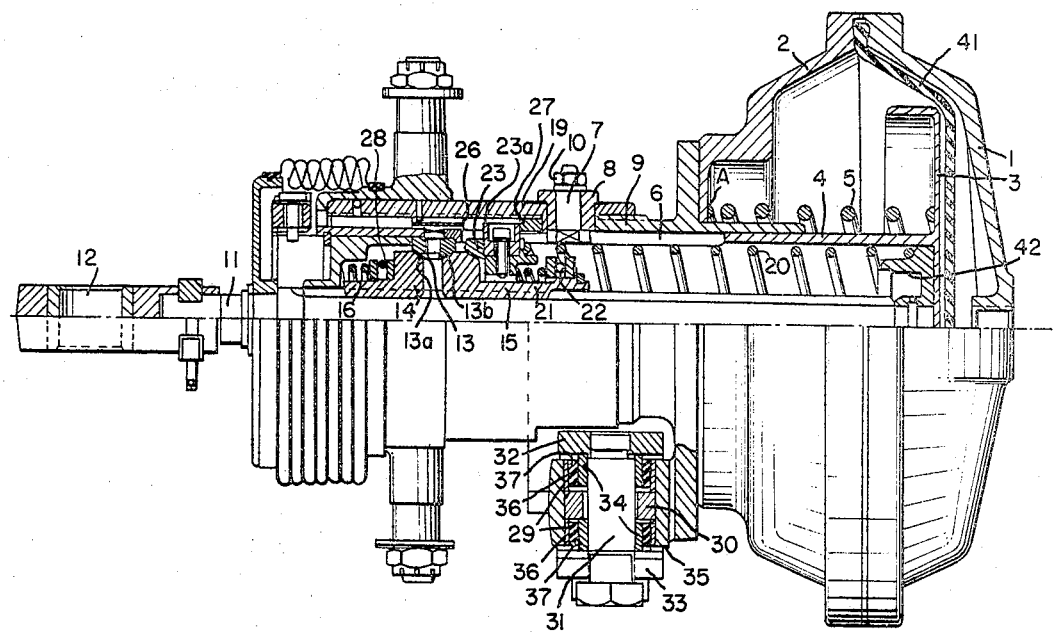
INVENTORS
WILHELM BRUHN
HANS POLLINGER

United States Patent Office 3,482,662
Patented Dec. 9, 1969

3,482,662
AIR BRAKE CYLINDER WITH SLACK ADJUSTER
Wilhelm Bruhn and Hans Pollinger, Munich, Germany, assignors to Knorr-Bremse GmbH, a corporation of Germany
Filed June 22, 1967, Ser. No. 648,055
Claims priority, application Germany, June 23, 1966, K 59,578
Int. Cl. F16d 65/46
U.S. Cl. 188—196                          5 Claims

ABSTRACT OF THE DISCLOSURE

An automatic slack adjusting arrangement for an air brake cylinder for railway vehicles wherein a spring is provided within a tubular piston rod and acting between the piston and a control member within the piston rod to urge the piston rod against an adjusting nut which contacts an abutment ring fixed within the tuublar piston rod. There is also disclosed a structure for resiliently and pivotally supporting the complete brake cylinder assembly at its center of gravity.

---

The present invention relates to air brake cylinders for railway vehicles, more particularly, to an improvement in an automatic built-in slack adjusting mechanism and a supporting arrangement for such air brake cylinder.

Air brake cylinders having a projecting push rod for transmitting the braking power of the brake cylinder to the brake rigging have been provided with various forms of built-in automatic slack adjuster mechanisms. Such air brake cylinders have been particularly used with disk brakes on railway vehicles. These air brake cylinders are generally quite heavy in construction so as to be adequate to transmit the high braking forces necessary for the heavy brake rigging used on railway vehicles, and occupy a considerable amount of space. Difficulties have been encountered in adequately mounting and supporting such air brake cylinders on the vehicle bodies. With disk brakes, the air brake cylinders are invariably pivotally supported but the supporting structures have heretofore been rather cumbersome and did not adequately absorb the vibrations. Accordingly, such vibrations were transmitted to the brake cylinder with the result that the operating efficiency of the brake cylinder was considerably decreased. Further, the transmission of the vibrations to the brake cylinder resulted in rapid deterioration of the slack adjusting mechanism. Thus, after relatively short periods of operating time, it was necessary to repair or replace the slack adjusting mechanism on such air brakes.

In addition, the available space in the vicinity of disk brakes was limited and it has been difficult to construct and properly mount an air brake cylinder having a built-in slack adjusting mechanism in this limited space.

It is therefore the principal object of the present invention to provide a novel and improved supporting structure for an air brake cylinder.

It is another object of the present invention to provide a novel and improved built-in slack adjusting mechanism for an air brake structure especially for railway vehicles.

According to the present invention, the air brake cylinder may comprise a cylinder body having a cylinder front head with a brake piston being slidable in the cylinder body. A spring may be provided between the brake piston and the cylinder front head to return the brake piston to its release position after braking action. A tubular piston rod is secured to the brake piston and is slidably guided in the cylinder front head. A screw threaded push rod is telescopically positioned within the piston rod and is axially displaceable therein. An abutment ring is fixed within the tubular piston rod. On each side of the abutment ring and engageable therewith is an axially displaceable adjusting nut threaded on the push rod. The forward adjusting nut is acted upon by the abutment ring to move the push rod when compressed air is introduced against the brake piston during braking action. The second adjusting nut is axially displaceable on the threaded push rod to maintain constant the travel of the piston rod during braking action thereby compensating for wear on the braking surfaces of the brake shoes. There is a control ring within the tubular piston rod and in contact with the second adjusting nut. There is a spring within the tubular piston rod between the piston end thereof and acting upon the control ring and the second adjustig nut to urge the second adjusting nut threads into contact with the meshing threads of the push rod.

The brake cylinder assembly may be mounted, for example, on the side rail of a truck frame by a supporting structure which includes at least one resilient ring and a metal bushing. This supporting structure resiliently and pivotally supports the air brake cylinder at its center of gravity. During the braking action the relatively resilient rings may be displaced until the bearing blocks make metallic contact. This structure prevents the usual rapid deterioration of known brake cylinder supports when subjected to vertical and horizontal impacts during vehicle travel.

Other objects and advantages of the present invention will be apparent upon reference to the accompanying description when taken in conjunction with the following drawing, which shows a plan view of an air brake cylinder and mounting structure therefor according to the present invention with a half of the cylinder being shown in section and the mounting structure also being in section.

As may be seen in the drawing, the air brake cylinder of the present invention comprises a cylinder body having a dished cylinder pressure plate 1 having a central inlet port therein for connection to a source of air pressure and a cylinder front head 2. Within the cylinder body is a brake piston 3 connected to a tubular piston rod 4 which is slidably guided in the cylinder front head 2. There is a flexible diaphragm 41 on the pressure side of the brake piston with the peripheral edge of the diaphragm clamped between the flanges of the cylinder body. The flanges are secured together by a known clamping arrangement which may comprise a clamping ring having U-shaped cross-section but not shown in the drawing. There is a compression brake cylinder release spring 5 positioned between the piston 3 and the cylinder front head 2.

In order to hold the tubular piston rod 4 against rotation, the piston rod is provided with two longitudinal slots 6 which receive studs 7. The shank end of stud 7 is flattened on both sides and is secured by a screw 8 threaded tightly into mounting sleeve 9 and secured in place by a locked castellated nut 10.

A projecting brake cylinder push rod 11 is telescopingly disposed within tubular piston rod 4 with its outer end 12 being adapted for operative connection to a brake rigging. At the inner end of push rod 11 there is mounted a piston plate 42 which is positioned against piston 3.

As illustrated in the drawing, the push rod 11 is constructed as a screw spindle and has a non-self locking thread thereon.

Fixed on the inner surface of tubular piston rod 4 is an abutment ring 13 which has oppositely disposed abutment surfaces 13a and 13b. A pair of adjusting nuts 14 and 15 are screwed onto the push rod 11 on each side of abutment ring 13. The lead of the coacting threads of the screw spindle on push rod 11 and the adjusting nuts 14 and 15 is sufficiently high so as to make the nuts non-self locking.

A spring 16 and an anti-friction thrust bearing 28 are axially clamped between the adjusting nut 14 and an abutment at the open end or mouth of the tubular piston rod 4. In the illustrated brake release position the spring 16 holds the nut 14 non-rotatably engaged with abutment surface 13a on the abutment ring.

The second adjusting nut 15 abuts at 13b against the abutment ring by means of a control ring 23 which is axially slidable within piston rod 4 only within the normal travel of the brake piston on application and release of the brake. Control ring 23 is held against rotation by its studs 23a engaging in and extending radially through the longitudinal slots 6 in the tubular piston rod 4. The studs also coact with abutments 26 and 27 to limit the axial movement of the control ring in relation to the normal travel of the brake piston 3.

The adjusting nut 15 is rotatably and axially displaceably connected with control ring 23 by means of an anti-friction thrust bearing 22 and a spring 21 axially clamped between the adjusting nut and the control ring.

A spring 20 is positioned within tubular piston rod 4 and interposed between piston rod plate 42 and the control ring 23.

The spring 20 not only acts to couple control ring 23 with adjusting nut 15, but to also absorb vibrations and axial forces upon the screw spindle through the flanks of the screw threads thereon.

In the drawing, a brake piston shown in the release position and is held in this position under the action of spring 5 which acts against the cylinder front head 2. Since there is a clearance between the brake piston and the cylinder head 1 it will be apparent that the force of the return spring onto the brake piston in the release position is transmitted onto the cylinder front head 2 by means of the tubular piston rod 4, the abutment ring 13, adjusting nut 15, control ring 23, and its studs which engage an abutment on the mount sleeve 9. The adjusting nut 15 is thus subjected to thrust and is firmly clamped between abutment 13b and control ring 23 and is thus safely locked against rotation and displacement in either direction when the brake piston 3 is in the release position in the cylinder as shown in the drawing.

When the brake cylinder is in the release position as illustrated in the drawing, the adjusting nut exerts a force to the right on the spring 20 as viewed in the drawing by means of the piston rod plate 42 and the push rod 11. The spring 20 thus urges the adjusting nut 15 to the left as viewed in the drawing so that a force is exerted on the right flanks of the push rod screw threads by the engaging left flanks of the threads of adjusting nut 15. When vibrations from the vehicle are transmitted to the push rod and thus to its threads, both the push rod and adjusting nut 15 will move together and, accordingly, the push rod 11 will not shake or move axially with respect to adjusting nut 15. In the usual brake cylinders of this general construction, there existed an axial play between the adjusting nut and the push rod which was undesirable. Without the spring 20, the axial play of the push rod 11 within the adjusting nut 15 would very quickly damage and eventually destroy the meshing threads of these two components. The insertion of the spring 20 in the manner as described above and illustrated in the drawing overcomes this disadvantage of the customary brake cylinders of this type.

In braking, compressed air is admitted into the brake cylinder behind brake piston 3 and moves the piston and piston rod 4 forwardly or to the left as viewed in the drawing. The push rod 11 is moved by abutment ring 13 and adjusting nut 14 with the thrust exerted on adjusting nut 15 by abutment ring 13 producing a sufficient frictional force between the abutment ring 13 and the nut 14 for locking the nut 14 against rotation and displacement on push rod 11. Spring 21 will hold control ring 23 frictionally engaged with nut 15 and thus prevents rotation and displacement of nut 15 on push rod 11 and carries control ring 23 along in the forward braking movement of the push rod as long as this movement does not exceed a normal brake-applying stroke. When the forward movement of push rod 11 exceeds a normal brake-applying stroke, the forward movement of the control ring 23 is stopped by its studs 23a engaging the abutment 26. As push rod 11 continues to move after the movement of control ring 23 has stopped, spring 21 will oppose further movement of the nut 15 together with push rod 11 and will yield sufficiently to permit nut 15 to lose its locking frictional engagement with the control ring 23. Thus adjusting nut 15 will rotate and thus displace itself axially toward the right as viewed in the drawing. When the braking movement of push rod 11 ceases, nut 15 is again frictionally engaged with control ring 23 and locked against rotation.

The slack adjusting movement of push rod 11 with respect to the tubular piston rod 4 occurs during the return movement of brake piston 3 into its release position after the braking operation.

It will be apparent that when the brake cylinder is in the release position, spring 20 will urge control ring 23 and adjusting nut 15 in the forward direction so that the threads of the adjusting nut 15 and the push rod are in contact in one direction. As a result, axial forces and vibrations produced during the movement of the vehicle will not vibrate the push rod 11 with respect to the threads of the adjusting nut 15 and both the push rod and adjusting nut will move together.

The entire brake cylinder according to the present invention is resiliently and pivotally mounted on a vehicle frame or a truck frame by a resilient bearing mount which will be presently described in detail. Extending from the brake cylinder and preferably integral with the mounting or supporting sleeve 9 is a bracket 35 having a bore therethrough. Positioned within the bore are a pair of axially spaced resilient ring members 29 with a metal bushing or abutment ring 30 therebetween and closely fitted within the bore. Each resilient member comprises a resilient rubber ring 37. Metal rings 36 are attached to the outer peripheral surfaces of both resilient rings 29 and inner metal rings 34 are attached to the inner peripheral surfaces of the rubber rings. The metal rings may be attached to the rubber resilient ring by a suitable process such as vulcanization. In the normal position as illustrated in the drawing the inner rings 34 project outwardly beyond the ends of resilient rings 37 and the outer metal rings 36 are seated within the bore 35 and extends inwardly beyond the ends of the resilient rings to contact abutment ring 30.

The brake cylinder is attached to the vheicle frame by means of metal plates 32 and 33 which extend from the frame. A bolt 31 passes through the metal plates 32 and 33 and the bracket mount assembly to secure the metal plates 32 and 33 against the respective ends of the inner metal rings 34. When the bolt 31 is tightened, the metal rings 34 will be moved axially a short distance toward the metal bushing 30. However, the inner metal rings 34 will not be in contact with the metal bushing 30.

The inward axial movement of metal rings 34 will cause a pre-tensioning of the resilient rubber and metal ring in an axial direction with respect to the tension bolt 31.

It is pointed out that the metal bushing 30 has an inner bore which is somewhat greater in diameter than the bolt 31. Accordingly, when the brake cylinder is mounted as described above and illustrated in the drawing, the bolt will pass through the metal bushing without contacting the bushing and there will be a certain degree of radial play between the bolt and the metal bushing. This condition will exist as long as no outside forces act upon the arrangement as, for example, when the brake cylinder is in the unapplied or release position. In this condition, vibrations of the vehicle will be absorbed by means of the rubber rings in the resilient mount assembly and thereby will be kept from reaching the brake cylinder.

During a braking operation, reaction forces of the brake cylinder such as those caused by the application of compressed air to the brake cylinder will apply a load upon the bearing mount. Should this force exceed a determined amount, the rubber rings will be distorted radially on one side and the metal bushing 30 will move radially to contact the bolt 31. The reaction forces of the brake cylinder will then be transmitted around the rubber rings of the resilient mount and pass directly through the metal bushing, the bolt 31 and through the metal plates 32 and 33 to the vehicle frame.

As will be apparent from the drawing, the tension bolt 31 is positioned substantially horizontally and is located at the center of gravity of the brake cylinder. As a result, any pivotal movement of the brake cylinder because of reaction forces generated during braking operations or vehicle vibrations will cause the cylinder to pivot about the resilient mount located at its center of gravity.

Thus, with respect to the tension screw 31, radial forces and axial forces are both readily absorbed by this mounting arrangement.

Thus it can be seen that the present invention has disclosed an air brake cylinder particularly adapted for railway vehicles wherein a spring acts upon an element of the slack adjusting mechanisms so as to absorb vibrations upon this mechanism. Further, the complete air brake cylinder assembly is resiliently and pivotally mounted at its center of gravity by a mount structure wherein vertical and horizontal forces transmitted to the brake cylinder during the braking operations are readily absorbed. The mounting arrangement occupies a minimum of space and is thus particularly suited for use where the air brake cylinder of the present invention is employed with disk brakes. The spring with the slack adjusting mechanisms and the mounting of the air brake cylinder together contribute to significantly increasing the operating life of the air brake cylinder.

What is claimed is:

1. In an air brake cylinder, the combination of a cylinder body including a cylinder front head and a piston slidable therein, spring means between said piston and said cylinder front head for returning the piston to its release position, a tubular piston rod extending from said piston and slidably guided within said cylinder front head, a screw threaded push rod axially displaceable within said tubular piston rod, slack adjusting means threaded on said push rod and operatively connected to said tubular piston rod for axially displacing and lockingly positioning said push rod with respect to said piston rod to maintain constant the travel of the piston rod during braking, and means including a pair of axially spaced resilient members with each member comprising a resilient ring fastened to two concentric rigid rings for resiliently and pivotally supporting the air brake cylinder at its center of gravity.

2. In an air brake cylinder as claimed in claim 1 with said supporting means comprising a mounting bracket having a bore therethrough on said air brake cylinder and positioned between vertically spaced metal plates extending from the vehicle frame, a bolt passing through said metal plates and said mounting bracket, the diameter of said bolt being considerably less than the diameter of said bracket bore, an abutment ring within said mounting bracket bore surrounding said bolt and radially spaced therefrom, said resilient members surrounding said bolt within said mounting bracket bore on both sides of said abutment ring, the outer rigid concentric rings of said resilient members extended to contact said abutment ring and the inner rigid concentric rings extended to contact the respective metal mounting plates, both resilient rings being free for axial movement toward and away from said abutment ring, said inner and outer concentric rings being tensioned axially between the abutment ring and the metal plates.

3. In an air brake cylinder, a cylinder body including a cylinder front head and a piston slidable therein, spring means between said piston and said cylinder front head for returning the piston to its released position, a tubular piston rod extending from said piston and slidably guided within said cylinder front head, a screw threaded push rod axially displaceable within said tubular piston rod, an abutment ring mounted within said tubular piston rod, slack adjusting means threaded on said push rod and operatively connected to said tubular piston rod for axially displacing and lockingly positioning said push rod with respect to said piston rod to maintain constant the travel of the piston rod during braking, and a second spring within said tubular piston rod exerting an axial force against said slack adjusting means to urge the threads of the push rod and slack adjusting means into contact in one direction when the brake cylinder is in the released position.

4. In an air brake cylinder as claimed in claim 3 wherein said slack adjusting means comprises a pair of axially displaceable adjusting nuts threaded on said push rod on each side of said abutment ring and engageable therewith whereby one nut is acted upon by said abutment ring to move the push rod during braking and the other nut is axially displaceable to maintain constant the travel of the piston rod during braking, said second spring acting upon said other adjusting nut to urge the other adjusting nut and push rod threads into close engagement with each other.

5. In an air brake cylinder as claimed in claim 4 and further comprising a piston rod plate within said tubular piston rod at the piston end thereof, a control ring within said tubular piston rod and engageable with said other adjusting nut, said spring being between said piston rod plate and said control ring.

References Cited

UNITED STATES PATENTS 1,822,026    9/1931    Guy.
3,100,032    8/1963    Larson _____ 188—196

DUANE A. REGER, Primary Examiner

U.S. Cl. X.R.

188—203